Nov. 5, 1963 C. L. BUDDECKE 3,109,890
ELECTROSTATIC RECORDING AND TRANSLATION OF IMAGES
Filed Dec. 18, 1959 2 Sheets-Sheet 1

CHARLES L. BUDDECKE
INVENTOR.

BY H.C. Goldwire

AGENT

Nov. 5, 1963     C. L. BUDDECKE     3,109,890
ELECTROSTATIC RECORDING AND TRANSLATION OF IMAGES
Filed Dec. 18, 1959     2 Sheets-Sheet 2

CHARLES L. BUDDECKE
INVENTOR.

BY J. C. Goldwire

AGENT

United States Patent Office 3,109,890
Patented Nov. 5, 1963

3,109,890
ELECTROSTATIC RECORDING AND
TRANSLATION OF IMAGES
Charles L. Buddecke, Arlington, Tex., assignor, by mesne assignments, to Ling-Temco-Vought, Inc., Dallas, Tex., a corporation of Delaware
Filed Dec. 18, 1959, Ser. No. 860,446
21 Claims. (Cl. 178—7.2)

This invention relates to image reproduction devices and more particularly to an apparatus for the electrostatic recording of images and the translation thereof into a form amenable to transmission to a reproduction device for reconstitution of the original image.

While the present invention is readily utilized in numerous applications, a teaching of it requires only that it be described in the setting of a representative one of its embodiments. Since one of the more interesting of these resides in the utilization of the invention in photo-reconnaissance, this application will be described at length, from which description the nature of the invention and its usefulness in still other areas will be readily apparent.

A need has long existed for a simple, rugged, and reliable photo-reconnaissance system. Prior to the present invention, many methods and devices were developed and used; however, all have had certain shortcomings. For instance, one of the earliest methods, still in use at the present time, is that of ordinary aerial photography wherein a manned, camera-carrying aircraft is piloted over the subject area for taking photographs of the latter. The disadvantages attendant upon such a system are obvious. Not only is the life of the camera crew, in time of war, placed in jeopardy, but in addition, the very success of the mission is dependent upon the return of the reconnaissance aircraft. Furthermore, the intelligence information obtained by the aircraft is not available for scrutiny until after the aircraft has returned to its base and the development of the photographs has been completed. In other cases, especially in earth-orbiting vehicles and those with missions to or near celestial bodies away from the earth, utilization of the information stored on a photographic film necessarily requires the physical recovery of the exposed film from an extra-terrestrial mission or, as the only alternative, the development, in the vehicle, of the latent image on the film into a visible image that can be scanned, as by facsimile or television technics, and sent by radio transmission to a receiving site on the earth where the image is reproduced. Development of the photographs during flight of the vehicle necessitates the carrying of chemicals and mechanisms for accomplishing the development process. The environment in which the photographic film (or equivalent) is developed must be controlled because development of the film requires that the chemicals employed be held under at least some positive pressure and within certain temperature limits. A condition of zero gravity, where encountered, tends further to complicate the development process. The chemicals and the apparatus necessary for their use and for environment control, etc. add to the mass, bulk, and complexity of what must be carried in the vehicle. Where an extended series of photographs is to be made, the weight and bulk of the photographic film itself become burdensome. As the film is not reuseable, fresh film must be provided for every image that is to be recorded, and the photographic mission is at an end once the supply of unused film has been exposed. Furthermore, certain factors excessively limit the information which may be obtained photographically, representative ones of which factors result in limitations of sensitivity and image-resolution and produce photographic "noise" or fog.

Fog is cumulative over the life-time of the film up until development. The development process itself always tends to introduce some fog, and chemical reactions including those induced by short-wave radiations commence to deteriorate the film from the moment it is manufactured. Hence, shielding must be provided, and this becomes burdensomely heavy and cumbersome where the film must be carried for long periods and/or in or through locales of heavy, short-wave radiation.

A decrease in sensitivity of a photographic film or plate tends to accompany a decrease in the grain size of the photo-sensitive emulsion employed on it. Where the light available for exposure is relatively low in intensity and/or exposure time available is short, it is necessary to employ large photo-sensitive grains in the film inasmuch as more than one photon must impinge upon each individual grain before that grain can respond chemically and become "exposed." To ensure that a plurality of photons will be received by a particular grain in a given time, then, the grain must be made of a given finite size, and this size becomes quite large as lighting becomes poor and/or exposure time excessively short. Even gross increases in grain size, however, never entirely offset the limitations of sensitivity in photographic films.

An increase in grain size, moreover, tends to defeat the purpose of improving the information which can be conveyed photographically since the extent of the information is limited also by the resolution-capability of the film and because the latter decreases with an increase in grain size. Particularly, then, where fine detail is required in the photographic image for rendering the latter useful as information, limitations of resolution and sensitivity make a photographic film unsuitable as an image-receiving and storing medium. As an example of the effects of these limitations, a photograph of an earth-area or an area of a celestial body taken from a large height or distance and on an adequately sensitive film may show some gross features of the area but be too coarse in grain-size to be able to show physically smaller but more important details.

In recent years, another method of reconnaissance, i.e., television, has been made available. Of the several reconnaissance systems employing television, however, none has been entirely satisfactory. A serious disadvantage is that not only image scanning but also transmission must occur during the actual time that the image is present before the television camera. To provide at least one example of the serious effects of this handicap, the situation may be considered wherein a portion of the earth or other body comes between the reconnaissance vehicle and its receiving station: though an image is scanned, transmission thereof cannot be received because of the intervening body and hence is of no avail. Other serious disadvantages relate to problems of image-distortion and resolution. The high degree of resolution prerequisite to the intelligible representation of relatively small objects or details requires many closely spaced scanning lines and these, in turn, increase the time require for scanning. But while the longer, finer scanning would be helpful in increasing resolution capability, it cannot be employed, to the extent that would be desirable, in cases where the object scanned moves appreciably relative to the camera during the scanning interval, inasmuch as the scanning must be done so quickly as to be completed before movement of the object has resulted in excessive distortion in the scanned image. As a result, resolution capability is diminished, it being necessary to sacrifice good resolution for an acceptable degree of freedom from distortion. Furthermore, the system is handicapped by the excessive mass and bulk of the equipment necessary for providing and utilizing the high power required for scanning and transmitting a great volume of information in a brief time interval.

To alleviate in some measure the need for rapid scanning and thereby permit more nearly satisfactory resolution in television-equipped reconnaissance systems, it has been proposed that image-taking be accomplished by means of special television storage tubes. Though of some benefit in this regard, such tubes still must be scanned within a comparatively brief time after image reception in order to retain a degree of resolution making the stored image of worthwhile value, and they may not suffice where scanning and transmission must be delayed for periods extending up to, for example, several days. Furthermore, these tubes are rather bulky; only one image may be stored per tube; and each tube must have its own optical system, scanning means, etc. Thus, where it is desired that numerous images be stored and transmitted, the use of television storage tubes is impractical, and this especially is the case where, as in a reconnaissance satellite, bulk and weight are importantly critical.

With the advent of the space age, the need for a rugged, compact, lightweight, long-range reconnaissance system that is capable of image recording in and transmission from near and outer space has become imperative. For this purpose as well as for reconnaissance from within the atmosphere and for still other applications where fine reproduction of image detail is required, the system should be one yielding high image resolution without the sacrifice of sensitivity or the introduction of image distortion as in a system employing photographic film or television. In addition, it is greatly to be desired to provide such a system in which other disadvantages, inherent in photographic or television-equipped systems, are absent.

It is therefore, an object of the present invention to provide a novel photo-reconnaissance system which is simple, rugged, and lightweight.

Another object is to provide a reliable, long-range photo-reconnaissance system.

A further object is to provide a high-capacity image-receiving and transmisison system employing a re-useable image-receiving medium requiring no development and for which no shielding from light or other radiations need be provided except during an interval of time extending between a time immediately prior to exposure and the time of scanning and translation.

Yet another object is to provide an image-receiving and transmitting system in which high resolution of a moving image is achieved without excessive distortion or loss of sensitivity.

A still further object is to provide a photo-reconnaissance system in which scanning of received images may be delayed for long periods following image-taking and may be accomplished slowly and with low scanning beam current and narrow transmission bandwidths.

An additional object is to provide a novel means for storage of the photoconductive film in a configuration wherein leakage of electrostatic charges across the photoconductive material is radically diminished.

Another object of the present invention is to provide a high capacity photo-reconnaissance system which is capable of continuous tone detection.

Still another object of the present invention is to provide a photo-reconnaissance system capable of operation throughout the entire visible area of the spectrum and in other spectral areas as well.

Another object of the present invention is to provide a novel device for the translation and transmission of images.

Other and further objects and advantages of the present invention will be apparent from the specification and claims and from the accompanying drawing, in which:

Figure 1:
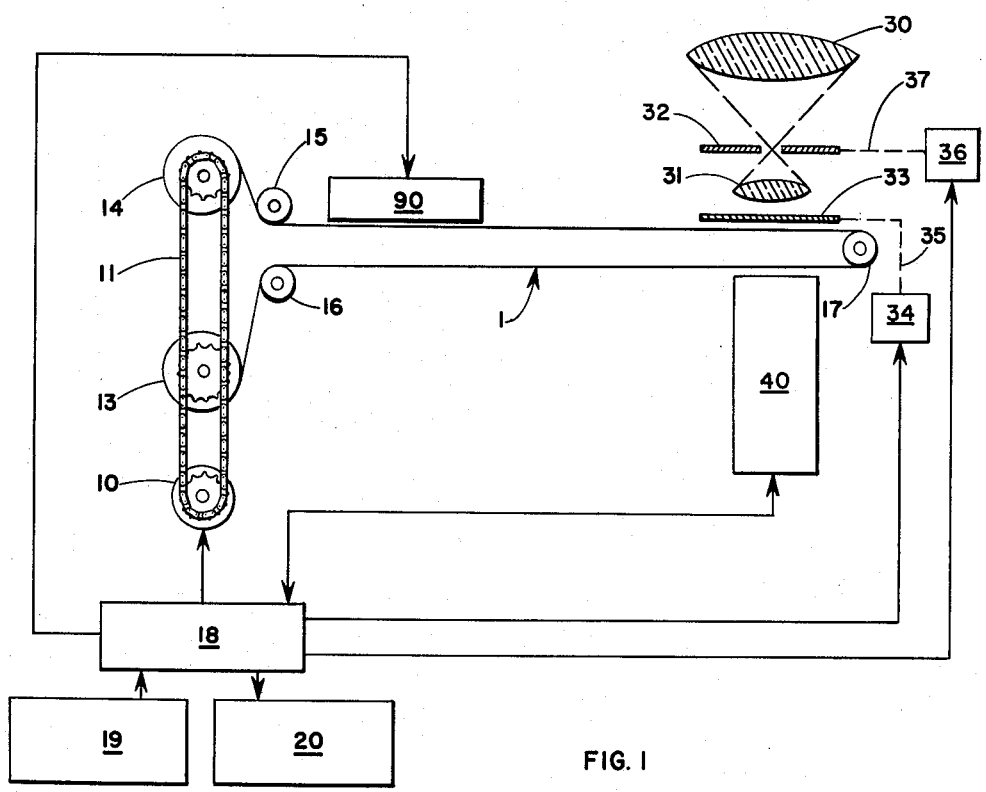
FIGURE 1 is a diagrammatic illustration of an embodiment of the present invention.

Refer to FIGURE 1, which shows a general embodiment of the present invention suitable for use as a photo-reconnaissance system. A motor 10 and drive system 11 drive the storage means spools or reels 13 and 14 upon which is stored a photoconductive film 1. The photoconductive film 1 is transported under an electrostatic charging device 90, focusing lenses 30 and 31, shutter 33, and adjustable aperture 32 and before the scanning device 40 by idlers 15, 16, and 17. Also shown in FIGURE 1 are a programmer 18, a command link 19, and data transfer link 20.

Figure 2:
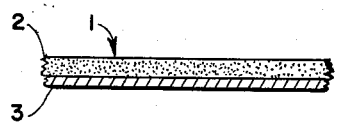
FIGURE 2 is a cross-sectional view of a portion of a preferred form of the photoconductive film utilized in the present invention.

Refer also to FIGURE 2, which shows a cross-sectional view of a prefererd form of the composite film 1 used in the present invention. A photoconductive material 2 such as selenium, cadmium sulfide, silver selenide, or germanium is applied, preferably in an amorphous form, to a flexible base 3 made of a conductive metal such as beryllium bronze, stainless steel, or aluminum. Any of several methods may be employed in applying the photoconductive material 2 to the base 3; however, a preferred method is that of vapor deposition by vacuum evaporation. Because of the amorphous character of the photoconductive material 2, organized groupings of the particles thereof are very small and the behaviour of the material is such that, for practical purposes, the "grains" thereof, by way of comparison with a photographic film, may be considered to be of molecular size. As each surface molecule, or at least a large majority of them, is able to respond to the reception thereby of a single photon of given energy-level, the results achieved by exposure of the film 1 to light for forming an electrostatic image thereon are, substantially, directly proportional to exposure time. Because of the ultra-microscopic smallness of the photoconductive particles, the photoconductive film possesses a virtually infinite image-resolving capability and imposes on the system virtually no limitations of resolution whatever.

When the photoconductive material 2 is electrostatically charged, it will hold the charge, subject to predictable decay, so long as the photoconductive material 2 is not exposed to visible or other radiations. When and where the charged photoconductive material 2 is exposed to radiant energy, for example, visible energy representing an image, the charge will decay in an amount somewhat proportional to the amount of light or radiation acting upon it. By the use of techniques and means described later, the decay-rate of the charge is so lessened as to make possible the very extended preservation of the initial, uniform charge and/or the electrostatic image.

The charged photoconductive film 1 is similar to an unexposed photographic film in that both may be exposed to an image defined by variations in intensity in visible light as well as in other portions of the spectrum extending into X-ray radiation. The exposed, photoconductive film differs, however, from an exposed photographic film especially in that the image produced by exposure of the photoconductive film is a latent, i.e., invisible, electrostatic (rather than chemical) image. Thus, the charged photoconductive film is in actuality a translation medium in that it is utilized to translate a spectral image into an electrostatic image which, as will be explained, is further translated preparatory to transmission and/or analysis. During exposure to light, for example, whose intensity varies, over the area exposed, in a manner forming an ordinarily visible image, the initial, uniform charge between the faces of the photoconductive material is locally dissipated by electron flow between those faces occasioned by and proportional to the intensity of light falling on each local area. An area of maximum illumination experiences maximum discharge. Thus, the voltage remaining at any given point after exposure corresponds to the intensity of the light that fell on it, and the voltage differences between it and other points in the exposed area are an analog representation, in electrostatic form, of the radiation energies representing the image.

In operation, the photoconductive film 1 is first passed, as shown in FIGURE 1, under the electrostatic charging device 90 with the photoconductive material 2 adjacent the latter. This charging, and the later-described exposing and scanning processes, takes place in the environment of a vacuum. In outer space, a vacuum is present and therefore no problem is presented; in other situations, however, a vacuum must be produced and maintained. The programmer 18 instigates and controls the charging process, and the electrostatic charger 90 inductively charges the photo-conductive film 1 with a substantially uniform electrostatic charge which may be either positive or negative. The choice of positive or negative charging for sensitizing is in effect dependent upon the photosensitive material, the conductive backing, and the preparation of the surface of the backing to which the photoconductive material is bonded. These parameters and the choice thereof are well known in the art for the preparation of photoconductive devices.

Figure 3:
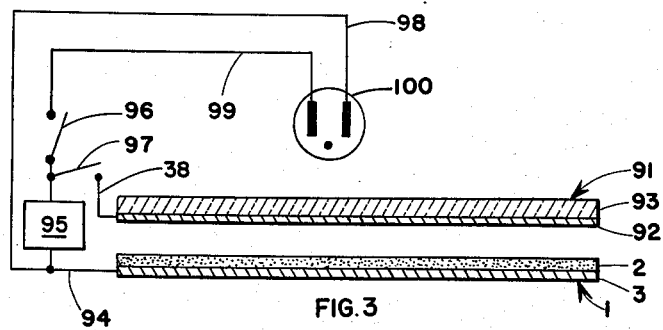
FIGURE 3 is a diagrammatic view of an electrostatic charger.

FIGURE 3 shows in further detail one device for inductive electrostatic charging. The particular portion of the photoconductive film 1 to be charged is brought under a transparent, electrically conductive charging plate 91. One method of preparing a transparent, electrically conductive charging plate 91 is to vacuum-deposit a thin, transparent layer of gold or other similar metal 92 upon a transparent plate 93.

If, for instance, the photoconductive film 1 is to be charged positively, a positive potential is applied along line 94 to the flexible conductive base 3 of the film 1 by means of, for example, a battery 95. The other (in this case, the negative) side of the battery is electrically connected through switch 96 and line 99 to one side of a light radiation source, for example, a gaseous discharge bulb 100, and to the metallic layer 92 of the charging plate 91 through switch 97 and line 38. Additionally, the other side of the light source 100 is electrically connected through line 98 to the positive side of the battery 95. Thus, when switches 96, 97 are closed, the gaseous discharge bulb 100 operates to illuminate the photoconductive material 2 through the charging plate 91, and a potential is introduced between the metallic base 3 of the photoconductive film 1 and the conductive layer 92 of the charging plate 91. Since, when the photoconductive material 2 is subjected to illumination or radiation it acts as a conductor, free electrons generated by the illumination of the surface of the photosensitive material 2 are drawn to the positively charged metallic base 3, thereby leaving a net, uniformly positive charge on and near the surface of the photoconductive material 2. With the switch 96 opened and the illumination removed, therefore, an electrostatic charge is trapped across the photoconductive material 2 upon opening of the switch 97.

Since not only visible light but radiations in other spectral regimes as well will render the photoconductive material 2 conductive, the gaseous discharge lamp 100 described above can be replaced by a radiation source (which, for example, can be a source of nuclear radiations) and a shutter-shield arrangement (not shown). Whether visible illumination or some other radiation is used to render the photoconductor 2 conductive depends upon the particular application; the spectral frequency output of the source used, however, ideally should be near the maximum sensitivity of the photoconductive material 2. For instance, since the maximum sensitivity of vitreous selenium is in the near ultra-violet regime, an illumination source having a spectral output in the near ultra-violet regime is preferred for use with a photoconductive layer 2 made of this material.

The thickness of the particular photoconductive material 2 used is of course dependent upon both the magnitude of the electrostatic charge which it must hold and the length of the time-interval during which it must hold it.

The storage means comprises means for holding the film 1 and in particular an appropriate mechanism or device for accepting and holding the charged, exposed film and for relinquishing the same where required for positioning it before the scanning device. As will be explained in further detail in later paragraphs, the storage means is, in one form of the invention, required to store the film while in its uniformly charged, not yet exposed condition. In both cases, and as an important feature of the invention, the storage means, in a preferred form thereof, retains the film in such manner that portions of the film lie in such relation to each other that the potentials representing the electrostatic images are redistributed for drastically reducing the normal leakage which otherwise would occur through the finite resistance of the photoconductive material to an amount so small that the potentials are readily retained for days and even weeks. This relationship is one wherein the conductive base layer 3 of one portion of the film is placed in close, overlying relationship with the photoconductive layer of another portion. In the embodiments shown herein, this is simply and effectively accomplished by rolling the film upon itself so that its face 2 comes into overlying relation with its face 3 throughout substantially all the length of the continuous film. While of primary importance in effectuating long storage life of charges upon the film, it will be noted that the incidental advantage of storage of the film in its most compact configuration is concurrently achieved and that a simple and reliable mechanism, by virtue of the preferred film storage technique, can be employed. For example, the storage spools 13, 14, motor 10, and drive mechanism 11 elsewhere described typify the simplicity of the means which may be employed.

Figure 4:
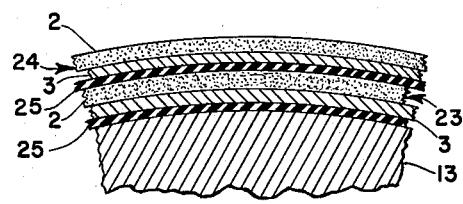
FIGURE 4 is a fragmentary, sectional view of a storage means reel on which are wound turns of a form of the photoconductive film.

In a charged photoconductive film, exposed or unexposed, the potential present at any one point on the film exists across the thickness of the photoconductive material 2 between its face contacting the conductive layer 3 and its opposite face. As shown in FIGURE 4, a portion 23 of the continuous film 1 is wound upon one of the storage means spools or reels, for example, the spool 13. By rotating the spool 13 by one revolution, a second portion 24 of the film 1 is laid down upon the first portion 23 with the conductive layer 3 of the second portion 24 adjacent the photoconductive layer 2 of the first portion 23. It will be understood, of course, that the conductive layer 3 of the portion 24 is electrically continuous with the layer 3 of the portion 23. FIGURE 4 shows a dielectric layer 25, made of any good insulating material preferably having a high dielectric constant, attached on the face of the conductive layer 3 opposite its face bonded to the photoconductive material. A portion of the dielectric layer 25, hence, lies between the layer 3 of the portion 24 and layer 2 of the portion 23. The charge existing across the photoelectric material 2 of portion 23 is redistributed between the conductive layer 3 of portion 23, the photoconductive material 2 of portion 23, the following layer 25 of dielectric material, and the conductive layer of the portion 24 when the film is in the configuration shown in FIGURE 4. The potential induced across the dielectric layer 25 is in proportion to its dielectric constant relative to the dielectric constant of the photoconductive material 2. Hence, the voltage gradient across the photoconductive layer of the portion 23 is greatly reduced and leakage through it is consequently and drastically diminished. Another revolution of the spool 13, of course, places another portion (not shown) of the film 1 over the portion 24 with the same result. The same configuration of the film 1 is of course obtained when it is wound upon the other reel 14, and the result obtained in preserving an electrostatic charge on the film is as described above. While it may be employed for increasing the dielectric constant between faying portions of the conductive layer 3 and the photoconductive layer 2, it has been shown that complete absence of such layer 25 does not negate the relative effectiveness of the configuration described in increasing storage life of charges on the film. Upon removing successive turns from the storage spool 13 or 14, the total charge is again returned to a condition wherein it lies altogether across the photoconductive material and in its original distribution.

After a particular portion of the film 1 has been charged, the programmer 18 (FIGURE 1) causes the motor 10 and drive system 11 to operate for stepping the film 1 forward a given interval, for example, one frame. That portion of the film 1 adjacent the charging device 90 is then charged and the film 1 stepped forward another frame. Repetition of this process causes the charged frames to "step" past the focusing system, which may include lenses 30 and 31, a shutter 33, and aperture 32. The shutter 33 is operated by a shutter-control means 34 having, for example, a mechanical connection 35 with the shutter 33. Similarly, a control means 36 with connection 37 is provided for operation of the aperture 32. The lenses 30 and 31, the chief usefulness of which ordinarily is in or near the visible spectrum, may be either of the reflecting or refracting type. For other spectral regimes, and in some cases in the visible regime as well, other special apparatus (not shown) such as gratings and other types of spectral separators may be used to generate and focus an image on the sensitized frames. In cases where X-rays are employed for exposing the film and in still other cases where the object of which an image is taken intercepts energies to create an image on a film placed in close proximity to the object, no lenses or other focusing means need be employed.

The operation of the shutter 33 and aperture 32 through their respective control means 34, 36 or the control (as required) of any special spectral separators employed is, like the charging operation and motion-generating function described above, controlled by the programmer 18. Thus, after the film 1 has been electrostatically charged, "stepped" into optical alignment with the focusing system and there exposed, a latent, electrostatic image of the subject, because of the photoconductive effect, is formed on the photoconductive film 1. It is possible, therefore, to sensitize or charge and then expose each individual frame in sequence and to store the series on the spool 13. It is an important advantage of the present invention that it is not necessary to perform any scanning operation while the object of which an image is taken is being viewed. Hence, no scanning time, during which the image of the viewed object could become distorted is involved, only a short exposure time during which an electrostatic image is formed being required. Because of the high sensitivity of the photoconductive film and the system employing the same, this time is so short that, even in relatively dim light, images may be taken of fast-moving objects without appreciable distortion.

After the image-taking operation has been completed, the travel of the photoconductive film 1 is reversed and the latent images are each brought into scanning alignment with the scanning system 40 in order that each image, as will be explained, may be translated into an electrical signal for transmission to a receiving station. It also will be understood that scanning may be accomplished, if desired, during the initial passage of the exposed film before the scanner and onto the spool 13.

Figure 5:
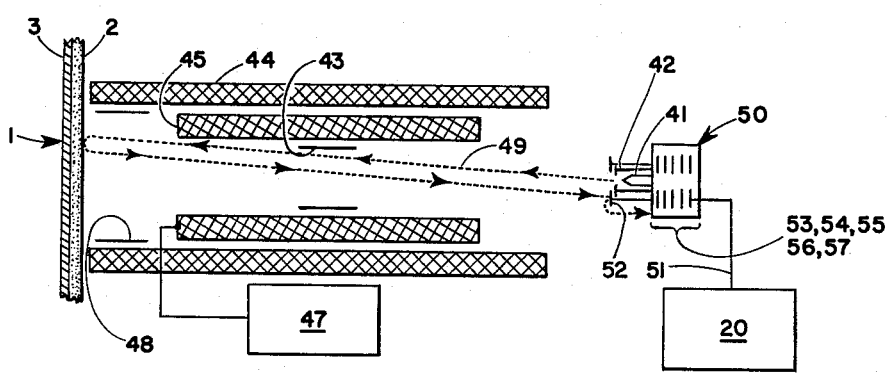
FIGURE 5 is a diagrammatic view of one embodiment of an electron-beam scanner, parts of which are shown in section.

Refer next to FIGURE 5, which shows one means of scanning the electrostatic or latent images. A frame of the photoconductive film 1 has an electrostatic image thereon to be scanned. An electron flow is generated by the cathode 41, accelerated by an accelerating grid 42, and focused into a beam 49 with the smallest practically possible diameter by the electrostatic action of the focusing element 43 and the electromagnetic action of the focusing coils 44. The electron beam 49 is deflected either by deflection coils 45 or deflection plates (not shown, but well known in the art) depending upon whether electromagnetic or electrostatic deflection is used. The deflection control circuits 47 generate a horizontal reading sweep at a rate compatible with both the desired signal-to-noise ratio for the particular range of electrostatic potentials representing the image on the photoconductive film 1 and the current-magnitude of the electron beam 49. The return sweep should be as rapid as is possible, the limiting factor of course being the time required to reverse the current flow in the deflection coils 45 or reverse the polarity of the deflection plates if the latter are employed. The sweep should be at a rate compatible with the desired vertical resolution and dependent upon horizontal reading rate and retrace time. The deflection control circuits 47 thus generate a reading scan that forms a raster of contiguous scanning lines over the entire electrostatic image.

A decelerator grid 48 retards the velocity of the electrons so that electrons in the beam 49 are at substantially zero velocity when they reach the electrostatic image. A negative charge does not affect the beam current, while a positive charge attracts electrons from it, thus reducing beam current; hence, electron density of the beam 49 is modulated by the variations in the electrostatic charges on scanned areas of the photoconductive film 1. Under influence of the accelerating grid 42, the modulated beam 49 reverses direction and approximately retraces its path through the scanning fields generated by the deflecting coils 45 to the first dynode 52 of the multiplier section 50 which is adjacent the cathode 41. This multiplier section 50 makes use of cumulative amplification resulting from the secondary emission of electrons at each succeeding dynode 53, 54, 55, 56, 57. The electrostatic image is thus converted into an electrical signal which is continuous (except during retrace) and which is an analog of the electrostatic voltages of the scanned, invisible image, the parameters of this signal including time versus voltage (or current). The signal thus defined is termed herein a time-analog signal.

The modulation of the electron beam 49 in the scanning of the electrostatic image on the photoconductive film 1 can be effected by a relatively small voltage difference representing the dynamic response of the photoconductive film 1 to the extreme levels of intensity of the light representing the image. In addition to modulation of the beam by the image, the beam current (which, following modulation, is a representation of the scanned image) can be amplified by suitable electronic means. Consequently, the relatively small amount of illumination required to discharge some of the uniform electrostatic charge during exposure to form the recorded, static image is all that is required to provide an amply sufficient and useable electrical signal which represents the image and which can be transmitted. It has been empirically demonstrated that the light-energy radiation required to discharge the initial charge of a photoconductive film (which charge, by the use of induction charging technics, may be made quite high) by 50% is comparable to the amount of light required for adequate exposure of a photographic film of good quality. It is important to note, however, that such a great degree of discharge of the photoconductive film is by no means required for the purposes of the present invention, and there is required a discharge of not fifty but only a few percent to provide a voltage difference fully adequate for electron-beam scanning, a voltage difference of 5 volts being, for example, entirely adequate in some applications. It therefore follows that a much lower light-intensity (or shorter exposure time) is required, for the purposes of the present invention, for satisfactory exposure of the photoconductive film than is the case in a photographic film and that, hence, the sensitivity of the present system is many times greater than that of one employing photographic media.

The analog voltage eventuating from the above-described scanning is passed along line 51 to the data transmission link 20 where it is amplified and transmitted to a remote receiving station where it may be reproduced in any manner analogous to the scanning process, adequate means and methods for such reproduction being well known. Because of factors including the wide range of charging-voltages employable on the photoconductive material of the film 1 without compromising the performance of the latter, the smallness of the voltage difference, from point to point on the image, needed for modulating the scanning beam, and the leisurely scanning possible in operation of the invention, the system presently contributed to the art permits adjustment of the scanning rate, electron beam current, and electron beam spot size for best compatibility with the transmission and reproduction technics employed in each particular application and with the degree of image-resolution desired.

Figure 6:
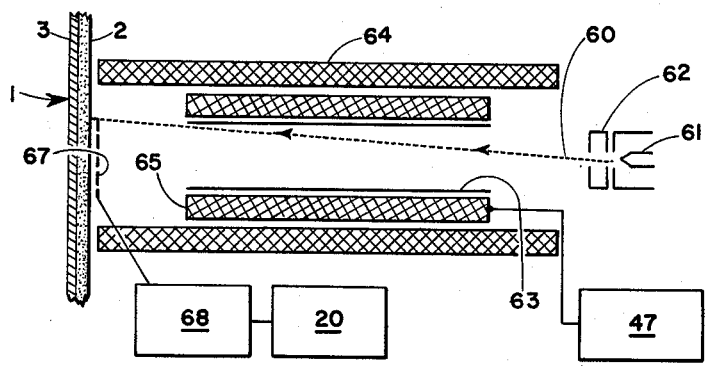
FIGURE 6 is a similar view of an alternate embodiment of an electron-beam scanner.

Refer next to FIGURE 6. In addition to the low-velocity reading technique described above, the electrostatic image is amendable to scanning in which the electrons of the scanning beam impinge upon the photoconductive material at high velocity, thus causing secondary emission from each discrete point of impact. A frame of the film 1 with the photoconductive material 2 has an electrostatic image thereon to be scanned. An electron beam is generated by the cathode 61, accelerated by the accelerating grid 62, and focused into a beam 60 of the smallest practically possible diameter by the electrostatic action of the focusing element 63 and the electromagnetic action of the focusing coils 64. The electron beam 60 is deflected either by deflection coils 65 or deflection plates (not shown) depending upon whether electromagnetic or electrostatic deflection is used. In the manner previously explained, a reading scan may thus be generated to form a raster of contiguous scanning lines over the entire electrostatic image.

In this high-velocity scanning system, a collection element 67 is provided to collect the secondary electrons released by the impinging of the beam 60 upon the photoconductive material 2. The number of secondary electrons collected by the collection element 67 as a consequence of impingement of an electron of the scanning beam 60 upon the photoconductive material 2 is a function of the voltage of the particular electrostatic charge at the point of impact. The secondary emission current, therefore, is a representation of image intensity as a function of time. This image representation is amplified in amplifier 68 and passed to the data transmission link 20 for transmission to a remote receiving station.

As mentioned above, the programmer 18 (FIGURE 1) controls the charging, stepping, scanning and transmission functions and also operates the switches 96, 97 (FIGURE 2) and governs the shutter and aperture control means 34, 36. For the latter, the programmer 18 contains means for sensing the overall intensity of illumination that will fall upon the film 1 and for governing operation of the shutter and aperture control means 34, 36 in accordance therewith. As light-intensity sensing means including, for example, photoelectric cells, are well known, it will not be necessary to more fully show or describe the same herein. In a preferred embodiment, the programmer 18 includes logic and timing circuits for determining and sequencing the operations which it controls. The program to be followed by the programming means 18 may be provided by an operator, where one is present; by a detailed program inserted before operation is to begin; or by radio signals received through the command link 19.

Figure 7:
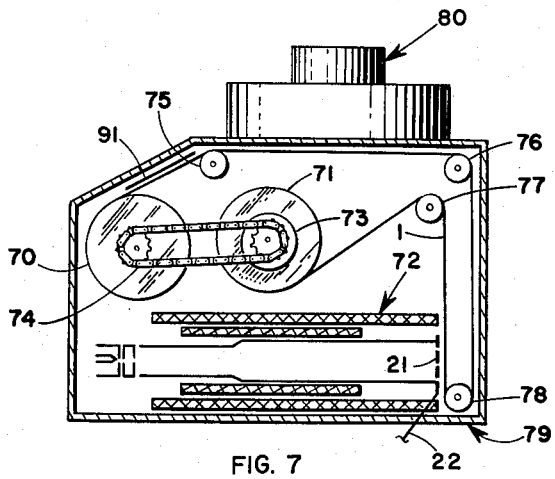
FIGURE 7 is a diagrammatic illustration of an alternate embodiment of the present invention, some parts thereof being shown in sectional view.

In FIGURE 7 is shown a modification of the present invention which may be utilized, for instance, for image transmission from one place to another to accomplish much the same result as is accomplished by present-day facsimile systems and which, to provide another example, is also of superior usefulness in manned or unmanned aerial or other vehicles in which the stored information is taken from the photo-reconnaissance system after its return to or arrival at a given place. Storage means reels or spools 70 and 71, scanner 72 similar to the scanner shown in FIGURE 6, stepping motor 73, drive system 74, idler sprockets 75, 76, 77, and 78, photoconductive film 1, and a charging means of which, for convenience of illustration, only the plate 91 is shown, are contained in an evacuated envelope 79. The operation of this embodiment is in substantial conformity with the embodiment described above. The photoconductive film 1 advances from spool 70 to a position under charging plate 91 where it is electrostatically charged by the latter. The charged film 1 is then "stepped" or advanced into optical alignment with the focusing means 80. The subject image is then, as before, electrostatically formed on the film. After all of the desired images have been electrostatically stored, the action of the stepping motor 73 is reversed and the electrostatic image scanned and the thus-obtained signal is transmitted by wire, radio, or otherwise to a remote receiving point, the signal being received as a flow of electrons by the collection element 21 and passed from the latter to, for example, an amplifier and data transmission link (such as shown at 68, 20, in FIGURE 6) through a conductor 22 connected to the collector 21. Where the device is employed in a reconnaissance vehicle, scanning and radio transmission may be accomplished while the device is remote from the receiving station; or, where the particular application permits, the information may be supplied during scanning from the conductor 22 directly to information-receiving and display equipment. In the latter case, image-taking may be accomplished during flight of a vehicle and scanning deferred until after return (or recovery) of the vehicle. Thus, in utilizing this embodiment for image transmission, the problems usually attendant upon facsimile transmission, such as the physical attaching of the subject matter to the drum each time an image is to be transmitted, mechanically synchronizing the transmitting and receiving drums, and mechanically scanning the subject material using photoelectric means, are alleviated. Instead, a series of images may be electrostatically acquired, stored, scanned, and transmitted in a matter of seconds. Because the transmitted signal, in all embodiments, is one which varies continuously with the variations in the image scanned, the present invention provides means and method of transmitting images of continuous tone. In addition, as explained above, it provides a system of concurrently high sensitivity and resolution.

In all forms of the invention described, to provide specific examples thereof, above, it will be noted that, since the latent image is electrostatic, the invention does not require the use of developing chemicals or apparatus, nor is the system affected by conditions of zero gravity and zero pressure. Images already on the film are erased and the film is rendered resensitized and reusable by passing it under the charging device 90 or 91; hence, the film may be used over and over again. Since many images may be stored in a comparatively small space in a lightweight medium and since the film is reuseable indefinitely, the system is of exceptionally high capacity. This advantage is important in any application and is most especially of extreme value in, for example, a reconnaissance satellite. The film need not be protected from radiations prior to its being charged, and therefore its shielding from light and, where any is required at all, from high-energy radiations, need only be heavy enough to provide the degree of protection necessary for the interval between charging and scanning of the film.

Because of the small "grain size" employable in the photoconductive film without sacrifice of sensitivity, almost infinitely high resolution is possible insofar as this is determined by the characteristics of the film. Since, in a photoconductive material, photons outside the visible portion of the spectrum are effective, the device is capable of operation throughout the entire visible portion as well as other portions of the spectrum.

Because it is not necessary to scan the electrostatic image during the time that the object represented is being viewed, scanning may be deferred, if desired, after image-taking and may be interrupted and recommenced as desired to take advantage of times, for example, when a satellite passes near the earth and on the same side as its receiving station. For the same reason, scanning may be accomplished leisurely and at low beam current and resulting small scanning-spot size; hence, many closely spaced scanning lines may be employed and advantage taken of the almost infinitely high resolution capability of the film. An additional advantage of the leisurely scanning rate is manifested in the attendant reduction of transmission bandwidth required and the consequential reduction in transmitter complexity and power requirements over the transmitter bandwidths and power requirements necessary where, as in television, scanning must be accomplished much more rapidly, particularly where the object scanned is in motion. Since what is scanned, in the present system, is a static, stored image, no distortion results from the slow scanning.

Because the film 1 is retained in a vacuum and especially because of the configuration in which it is stored, deterioration of a stored image on the film as well as of, where desired, a uniform charge on the film, is greatly slowed. Consequently, scanning may be deferred for many hours after image-taking and may be interrupted and re-commenced as desired. Similarly, the film may be stored for long periods in its uniformly charged, unexposed condition where desired.

While FIGURE 1 is illustrative of the form of the invention described in connection therewith above, it also is intended to serve as illustration of a modification wherein the charging means 90 described is omitted and a technic employed whereby the initial charging of the film is accomplished through the instrumentality of the scanning means 40. Assuming, for illustration, that the scanning means 40 of FIGURE 1 is of the nature of the device shown in FIGURE 6, a portion of the film 1 to be charged or sensitized is positioned as shown in FIGURE 5 and the charge on the surface thereof is made negative relative to the conductive layer 3 by depositing thereon electrons whose energy is just sufficient to ensure their transport from the cathode 61 to the photoconductive material 2. A desired potential and uniformity of the charge are assured by deflecting the electron beam 60 in the same manner as in the scanning process described above to form a raster of contiguous lines evenly covering the area to be sensitized. If it is desired to place a positive charge on the surface of the photoconductive material 2 opposite the conductive coat 3 and relative to the latter, the energy imparted to the electrons of the beam 60 is increased, by an increase in the voltage on the accelerating element 62, to a point above that at which impingement of the high-velocity electrons of the beam 60 causes secondary emission of electrons from the photoconductor 2. The secondary emission electrons are greater in number than the beam electrons and are accumulated by the collecting element 67; the result, hence, is a net positive charge on the surface of the photoconductive material 2. It will be evident that the scanning device of FIGURE 5 also is amenable to use for charging the film 1 in a manner corresponding to that described immediately above. Sensitizing of the photoconductive material 2 also may be accomplished by flooding the same with unfocused electrons from the cathode 61 (FIGURE 6) or 41 (FIGURE 5).

While the apparatus and the modifications thereof shown and described in connection with FIGURE 1 are simple in construction and operation it should be noted that the sequences of operation thereof are not limited to those described above. Instead, the operation of the device is of a great versatility permitting many different combinations of and variations in the order of accomplishment of the operational events of sensitizing, image-taking, storage, and scanning. The same versatility, of course, is inherent in the device of FIGURE 7.

While only one embodiment of the invention, together with several modifications thereof, has been described in detail herein and shown in the accompanying drawing, it will be evident that various further modifications are possible in the arrangement and construction of its components without departing from the scope of the invention.

I claim:

1. An apparatus for the recording and translation for transmission of an image of a subject comprising a photoconductive film, means for electrostatically charging said photoconductive film, means for exposing said electrostatically charged photoconductive film to form an electrostatic image of said subject thereon, means for directly scanning said exposed photoconductive film with an electron beam, and means preventing exposure of the film during scanning.

2. An apparatus for the recording and translation for transmission of a plurality of images comprising a photoconductive film having a surface and an electrically conductive backing, means for illuminating the film surface and inductively imposing an electrical potential across the photoconductive film between the film surface and conductive backing during a desired charging period for electrostatically charging a plurality of frames occupying different areas upon said photoconductive film, means for exposing the film to electromagnetic energy, such as light, for forming an electrostatic image of a subject on each of said frames, means for obtaining a time-analog representation of said electrostatic images, said last-named means including means for scanning the frames of said photoconductive film with an electron beam, and means preventing exposure of the film during scanning.

3. An apparatus for the recording and translation for transmission of a plurality of images comprising a photoconductive film having a surface and an electrically conductive backing, means for illuminating the film surface and inductively imposing an electrical potential across the photoconductive film between the film surface and conductive backing during a desired charging period for electrostatically charging a plurality of frames occupying different areas upon said photoconductive film, means for exposing said charged film to form an electrostatic image of a subject on each of said frames, and means for obtaining a time-analog representation of said electrostatic images, said last-named means including means for sequentially scanning each of said electrostatic images with an electron beam having substantially zero electron velocity upon arrival at said electrostatic image, and means preventing exposure of the film during scanning.

4. The appratus claimed in claim 3, said apparatus including means for maintaining said electrostatic film in a vacuum.

5. An apparatus for the recording and translation for transmission of a plurality of images comprising a photoconductive film having a surface and an electrically conductive backing, means for illuminating the film surface and inductively imposing an electrical potential across the photoconductive film between the film surface and conductive backing during a desired charging period for electrostatically charging a plurality of frames occupying different areas upon said photoconductive film; means for exposing said charged frames to form an electrostatic image of a subject on each of said frames; means for obtaining a time-analog representation of said electrostatic images, said last-named means including means for sequentially scanning each of said electrostatic images with an electron beam having sufficient electron velocity upon striking said photoconductive film to cause secondary electron emission therefrom and means for collecting said secondary electrons to obtain a time-analog representation of each of said electrostatic images, and means preventing exposure of the film during scanning.

6. The apparatus claimed in claim 5, said apparatus including means for maintaining said photoconductive film in a vacuum.

7. An apparatus for the translation and transmission of images comprising a photoconductive film, having a surface and an electrically conductive backing, charging means for illuminating the film surface and inductively imposing an electrical potential across the photoconductive film between the film surface and conductive backing during a desired charging period for electrostatically charging a plurality of frames occupying different areas upon said photoconductive film, exposing means in operable association with said photoconductive film, scanning means for scanning said film with an electron beam, the same being distinct from said charging means and in operable association with said photoconductive film, and transmission means electrically connected to said scanning means.

8. An apparatus for the translation and transmission of images comprising a photoconductive film having a surface and an electrically conductive backing; means for illuminating the film surface and inductively imposing an electrical potential across the photoconductive film between the film surface and conductive backing during a desired charging period for electrostatically charging a plurality of frames occupying different areas upon said photoconductive film; an exposing means in operable association with said photoconductive film and including at least one lens, a shutter, and an aperture, electron-beam scanning means in operable association with said photoconductive film and distinct from said charging means, and transmission means electrically connected to said scanning means.

9. A apparatus for the recording and translation for transmission of images comprising first and second storage reels, a flexible photoconductive film having a conductive backing on said storage reels, stepping means in driving association with at least one of said storage reels, an electrostatic charger in operable association with said photoconductive film, exposing means in operable association with said photoconductive film for producing an electrostatic image thereon, and means for obtaining a time-analog representation of said electrostatic image, said last-named means including an electron-beam scanning means in operable association with said photoconductive film for scanning the electrostatic image at a time when the photoconductive film is nonconductive.

10. An apparatus for the recording and translation for transmission of images comprising first and second storage reels; a flexible photoconductive film having a conductive backing on said storage reels; a reversible stepping means in driving association with both of said storage reels; an electrostatic charger in operable association with said photoconductive film; exposing means in operable association with said photoconductive film; and means for obtaining a time-analog representation of electrostatic images on said film after exposure thereof and while the photoconductive film is non-conductive, said last-named means including an electron-beam scanning means in operable association with said photoconductive film and having an electron generating means, electron accelerating means, focusing and deflecting means, and deceleration means.

11. An apparatus for the recording and translation for transmission of images comprising first and second storage reels; a flexible photoconductive film having a conductive backing on said storage reels; a reversible stepping means in driving association with both of said storage reels; an electrostatic charger in operative association with said photoconductive film; exposing means in operable association with said photoconductive film; and means for obtaining a time-analog representation of electrostatic images on said film after exposure thereof, said last-named means including an electron-beam scanning means in operable association with said photoconductive film and having an electron generating means, electron accelerating means, focusing and deflecting means, and secondary electron collecting means.

12. An apparatus for the recording and translation for transmission of images comprising first and second storage reels; a flexible photoconductive film having a conductive backing on said storage reels; a reversible stepping means in driving association with both of said storage reels; an electrostatic charger in operative association with said photoconductive film; exposing means in operable association with said photoconductive film including at least one lens, a shutter, and an aperture; and means for obtaining a time-analog representation of electrostatic images on said film after exposure thereof and while the photoconductive film is non-conductive, said last-named means including an electron-beam scanning means in operable association with said photoconductive film and having electron generating means, electron accelerating means, focusing and deflecting means, and deceleration means.

13. An apparatus for the translation and transmission of images comprising first and second storage reels; a flexible photoconductive film with a conductive backing on said storage reels; a reversible stepping means in driving association with both of said storage reels; an electrostatic charging means in operative association with said photoconductive film; exposing means in operable association with said photoconductive film including lenses, shutter and aperture; and means for obtaining a time-analog representation of electrostatic voltages on said film after exposure thereof, said last-named means including electron-beam scanning means in operable association with said photoconductive film and having electron generating means, electron accelerating means, focusing and deflecting means, and secondary electron collecting means; and transmission means electrically connected to said electron-beam scanning means.

14. The apparatus claimed in claim 13, said apparatus further including programming means in operable association with and controlling operation of said stepping means, charging means, exposing means, and means for obtaining a time-analog representation of electrostatic voltages on said film after exposure thereof.

15. The apparatus claimed in claim 13, said apparatus further including programming means in operable association with and controlling operation of said stepping means, charging means, exposing means, and means for obtaining a time-analog representation of electrostatic voltages on said film after exposure thereof, and means for supplying signals from a remote source to said programming means to influence the operation of the latter.

16. An apparatus for forming and storing an electrostatic image of a subject, said device comprising: a flexible photoconductive film having a photoconductive layer and a conductive layer; means for producing on the photoconductive layer of a portion of said film an electrostatic image of said subject; and means for bringing the conductive layer of another portion of said photoconductive film into adjacent, over-lying relation with the photoconductive layer of the portion of said film on which said image has been produced.

17. An apparatus for the forming and extended storage of an electrostatic image comprising: a flexible photosensitive film having a conductive layer and a photoconductive layer; means for producing a substantially uniform electrostatic charge across said photoconductive layer; means for forming an electrostatic image on said photoconductive layer in one portion of said film; and means for redistributing the electrostatic charge remaining across said photoconductive layer after exposure of the same, said last-named means including a reel to which an end of said film is affixed and driving means for rotating said reel and thereby bringing said film into a configuration wherein the conductive layer of another portion of said film is wound over the photoconductive layer of the portion having said electrostatic image formed thereon.

18. An apparatus for the recording and translation for transmission of an image comprising: a photoconductive film having a conductive backing; means for electrostatically charging said photoconductive film; means for exposing light bearing a spectral image on said photoconductive film, after electrostatic charging of the same by said first-named means, to form an electrostatic image thereon; and means for terminating exposure of the film to light; said first-named means having the further function of obtaining, after termination of exposure of the film, a time-analog representation of said electrostatic image on said film and having an electron-beam scanning device which directs a flow of electrons directly to said film both in electrostatically charging said film and in obtaining said time-analog representation of said electrostatic image.

19. The apparatus claimed in claim 18, said flow of electrons to said film from said scanning device during electrostatic charging of said film being of an energy level low enough to permit retention of at least some of said electrons by said film to form a negative charge on the latter.

20. The apparatus claimed in claim 18, said flow of electrons to said film from said scanning device during electrostatic charging of said film being of an energy level high enough to produce the secondary emission, from said film, of more electrons than are directed to said film by said electron-beam scanning device.

21. An apparatus for the recording and translation for transmission of a plurality of images comprising: a photoconductor having a photoconductive face and a metallic backing forming a conductive face; a charging plate comprising a transparent, dielectric plate and a thin, transparent, conductive metallic layer deposited thereon, the charging plate being disposable with its metallic layer adjacent and generally parallel to the photoconductive layer of the photoconductor; an electrical power source with two opposite poles; a radiation source having two leads and positioned for illuminating the photoconductor, through the charging plate, with electromagnetic radiation; means for connecting one pole of the power source to the metallic backing of the photoconductor and to one lead of the radiation source and the other pole to the charging plate and other lead of the radiation source for illuminating the photoconductor and inducing an electrical potential across the same between the photoconductive surface and metallic backing during a desired charging period for electrostatically charging a plurality of frames occupying different areas upon said photoconductor; means for exposing the photoconductor to electromagnetic energy, such as light, for forming an electrostatic image of a subject on each of said frames; and means for obtaining a time-analog representation of said electrostatic images, said last-named means including means for directly scanning the frames of said photoconductor with an electron beam and means preventing exposure of the photoconductor during scanning.

References Cited in the file of this patent

UNITED STATES PATENTS

| 2,742,631 | Rajchman et al. | Apr. 17, 1956 |
| 2,864,887 | Weimer | Dec. 16, 1958 |
| 2,884,486 | Wise | Apr. 28, 1959 |
| 2,890,968 | Giaimo | June 16, 1959 |
| 2,917,385 | Byrne | Dec. 15, 1959 |
| 3,000,735 | Gunning | Sept. 19, 1961 |
| 3,040,124 | Camras | June 19, 1962 |
| 3,042,825 | Bambara | July 3, 1962 |

OTHER REFERENCES

Publication: "Television," 2nd Edition, Zworykin and Morton, John Wiley & Sons, New York, Section 7.10 et seq.

Television Engineering Handbook, Fink, McGraw-Hill Book Company Inc., 1957; pages 17-105, 17-106.